(No Model.)
J. B. KING.
BORING TOOL.
No. 552,065. Patented Dec. 24, 1895.
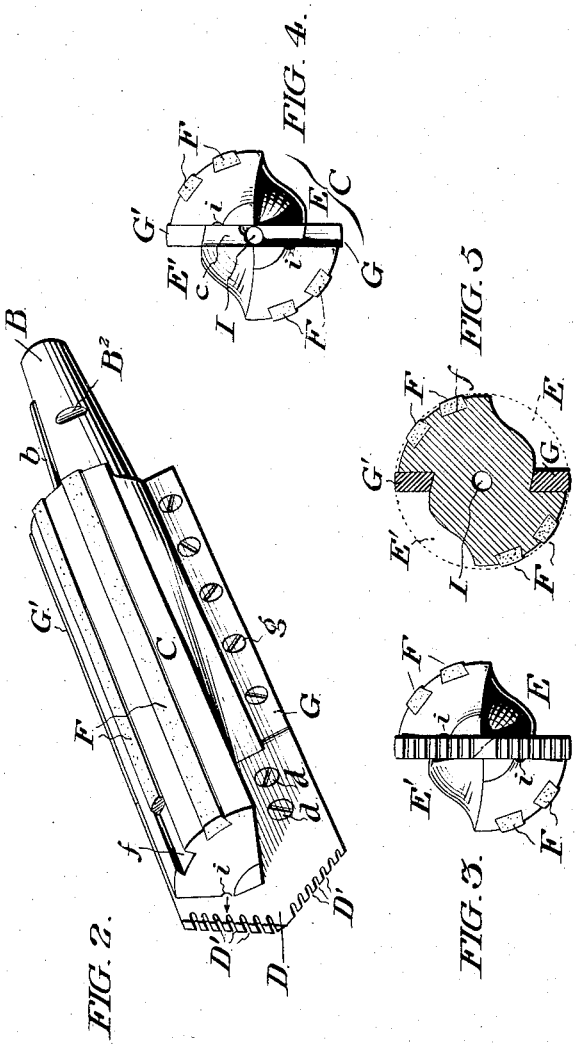
WITNESSES
A. E. Paige
Sam. Wright
INVENTOR
Joseph B. King
By Hollingsworth & Phelps
Attorneys

UNITED STATES PATENT OFFICE.

JOSEPH B. KING, OF PHILADELPHIA, PENNSYLVANIA.

BORING-TOOL.

SPECIFICATION forming part of Letters Patent No. 552,065, dated December 24, 1895.

Application filed May 26, 1893. Serial No. 475,552. (No model.)

*To all whom it may concern:*

Be it known that I, JOSEPH B. KING, of Philadelphia, in the State of Pennsylvania, have invented certain new and useful Improvements in Boring-Tools, whereof the following is a specification, reference being had to the accompanying drawings.

In said drawings, Figure 1 represents a side view of the tool; Fig. 2, a perspective view thereof; Fig. 3, an end view. Fig. 4 is an end view of the head with the bit or drill proper removed, and Fig. 5 is a transverse section on the line 5 5 of Fig. 1.

My invention relates to that class of boring-tools in which the bit or drill proper is carried by a head provided at its front end with a socket to receive said bit, and also provided with longitudinal clearance-channels extending rearwardly from the front or cutting faces of the bit on opposite sides of the axis of rotation.

The object of my invention is to so construct the head as to obtain a proper bearing-surface throughout its entire length for accurately guiding the bit, and at the same time to avoid any tendency on the part of the head to bind in or abrade the surface of the cavity, and, furthermore, to avoid the risk to which tools of this class are subject of having the chips or borings get in under the edges of the clearance-grooves and score the surface of the cavity. To this end I construct the head of substantially smaller diameter than the width of the bit, and combine with the head a series of longitudinal radially-projecting strips of relatively soft metal, arranged at intervals around the periphery, and I also provide, along that face of each clearance groove which corresponds with the front face of the bit on that side of the axis, a facing-plate of hard steel extending radially outward to the full diameter of the bit and flush with the front face thereof.

Referring to the drawings, A represents the boring-bar, having at its front end a tapered cavity to receive the shank B of the head C. Said shank is provided with a spline $b$, which engages in a corresponding groove in the side of the cavity in the boring-bar, and the shank is locked against longitudinal withdrawal by means of a pin $B'$ extending through a transverse hole in the boring-bar and a corresponding hole $B^2$ in the shank. The bit or drill proper D, of slightly greater width than the diameter of the head, is seated in a rectangular cavity $c$ formed diametrically across the front end of the head C, and is preferably secured in position by means of screws $d$ $d$. The cutting-edge of the drill is also preferably provided with a series of notches $D'$, which serve to break up the chips or cuttings, said notches being arranged to alternate on opposite sides of the axis, so that a cutting-edge is presented on one side of the axis at the same radial distance at which a notch is found upon the other side of the axis.

The longitudinal clearance-grooves are indicated at E and $E'$, said grooves having at the front end of the head (when the bit and face-plates are in position) a cross-section of substantially a quadrant of a circle, the bottoms of the grooves, however, preferably flaring outwardly somewhat as they extend rearward, so that the cross-section of the grooves near the rear end of the head is substantially that indicated in the sectional view of Fig. 5.

Facing-plates G $G'$ of hard steel are secured by screws $g$ along those faces of the respective clearance-grooves E and $E'$ which correspond with the cutting or front face of the bit on either side of the axis of rotation, the diameter of these strips being such that their outer edges are in line with the sides of the bit, and their thickness being such as to render their front faces flush with the front faces of the bit on either side of the axis. The outer edges of the strips G $G'$ extend therefore to the full diameter of the hole which has been bored, and form in effect prolongations of the sides of the bit carried rearwardly to the end of the head.

At regular intervals around the periphery of the head are formed longitudinal grooves $f$, whose sides are undercut, as indicated, so as to give a dovetailed cross-section. These grooves receive and hold strips F, preferably of magnolia metal or other relatively soft metal, or even of wood, whose thickness in a radial direction is such that they extend outward to the full diameter of the bit D, and thus form bearing-surfaces always in contact with the sides of the cavity which has been bored. Said strips are of course inserted longitudinally in the grooves and can be removed for renewal when desired.

Coincident with the axis of the head is a tubular channel I terminating at the front end of the head in two divergent gutters $i$ $i$, formed respectively in the sides of the cavity which receives the bit D. At the rear end of the shank said channel coincides with the front end of a channel I' formed in the boring-bar and extending outward, as shown, to the side thereof. The purpose of this channel is to supply oil at the point of operation of the drill as desired.

Having thus described my invention, I claim—

1. A boring tool having a head with longitudinal channels on opposite sides, and a central recess at one end, and a bit secured in said recess and bearing on its opposite sides against the sides in said channel, the periphery of said head having reduced portions, and projecting guide portions adjacent to said channels, said parts being combined substantially as described.

2. A boring tool consisting of a head with longitudinal channels on opposite sides and a central recess, the periphery of the head being reduced, and longitudinally extending, projecting guide portions adjacent to the said channels, and the reduced portions being provided with longitudinal pieces F, said parts being combined substantially as described.

J. B. KING.

Witnesses:
  JAMES H. BELL,
  E. REESE.